United States Patent
Cai et al.

(10) Patent No.: US 12,030,996 B2
(45) Date of Patent: Jul. 9, 2024

(54) INORGANIC DEGRADABLE PLASTIC MASTERBATCH MATERIAL, AND PREPARATION METHOD THEREFOR

(71) Applicant: ZHEJIANG SHANLIAN NEW MATERIALS TECHNOLOGY CO., LTD, Zhejiang (CN)

(72) Inventors: Jianyong Cai, Zhejiang (CN); Ruiya Li, Zhejiang (CN); Lichenxia Cai, Zhejiang (CN)

(73) Assignee: Zhejiang Shanlian New Materials Tech. Co., Ltd, Huzhou (CN)

( * ) Notice: Subject to any disclaimer, the term of this patent is extended or adjusted under 35 U.S.C. 154(b) by 308 days.

(21) Appl. No.: 17/688,828

(22) Filed: Mar. 7, 2022

(65) Prior Publication Data
US 2022/0195131 A1 Jun. 23, 2022

Related U.S. Application Data

(63) Continuation of application No. PCT/CN2020/106854, filed on Aug. 4, 2020.

(30) Foreign Application Priority Data

Sep. 9, 2019 (CN) .......................... 201910845341.1

(51) Int. Cl.
| | |
|---|---|
| C08J 3/22 | (2006.01) |
| C08K 3/26 | (2006.01) |
| C08K 3/40 | (2006.01) |
| C08K 7/14 | (2006.01) |
| C08K 7/18 | (2006.01) |
| C08L 23/08 | (2006.01) |

(52) U.S. Cl.
CPC .................. *C08J 3/22* (2013.01); *C08K 3/26* (2013.01); *C08K 3/40* (2013.01); *C08K 7/14* (2013.01); *C08K 7/18* (2013.01); *C08L 23/0815* (2013.01); *C08J 2323/16* (2013.01); *C08K 2003/265* (2013.01); *C08K 2201/005* (2013.01)

(58) Field of Classification Search
CPC ......... C08K 3/26; C08K 2003/265; C08J 3/22
USPC .......................................................... 523/351
See application file for complete search history.

(56) References Cited

FOREIGN PATENT DOCUMENTS

| CN | 103333395 A | 10/2013 | |
|---|---|---|---|
| CN | 106977794 A | 7/2017 | |
| CN | 109265806 A | 1/2019 | |
| WO | WO-2005017015 A1 * | 2/2005 | ............. B65D 65/46 |

OTHER PUBLICATIONS

International search report issued for counterpart Chinese patent application No. PCT/CN2020/106854 mailed on Nov. 6, 2020, along with English translation thereof.

* cited by examiner

*Primary Examiner* — Vickey Nerangis
(74) *Attorney, Agent, or Firm* — NZ CARR LAW OFFICE

(57) ABSTRACT

An inorganic degradable plastic masterbatch material is disclosed, the product prepared meets the degradation requirements and has higher mechanical strength and faster degradation rate than ordinary plastic products. The material is used to prepare various environmentally friendly degradable products. The inorganic degradable plastic masterbatch material comprises the following components: calcium carbonate mineral powder with mass percentage of 56-72%; polyethylene with mass percentage of 3-10%; polypropylene with mass percentage of 18-30%; glass fibers with mass percentage of 2-5%; and additives with mass percentage of 2-5%.

11 Claims, No Drawings

INORGANIC DEGRADABLE PLASTIC MASTERBATCH MATERIAL, AND PREPARATION METHOD THEREFOR

This application is a continuation of International Patent Application No. PCT/CN2020/106854 filed on Aug. 4, 2020, which claims the benefit of priority from the Chinese Patent Applications Nos. 201910845341.1 filed Sep. 9, 2019, The entire content of the aforementioned patent application is incorporated herein by reference.

TECHNICAL FIELD

The present invention relates to an inorganic degradable plastic masterbatch material and preparation method thereof, which are used to prepare various environmentally friendly degradable products.

BACKGROUND

The application of degradable plastic masterbatch has become more and more common in foreign countries for injection and blow molding applications. Foreign masterbatches are often expensive and unaffordable for domestic manufacturers. Due to the domestic technology and economic constraints, the development is relatively lagging behind. Especially in large-area injection molding, poor or not enough good dispersion performance leads to poor product quality, or easy to fade and ooze, etc., where there are also methods to add color masterbatch, but domestic color masterbatch generally has heavy metals exceeding the standard due to raw materials, pigments and additives, which is not applicable to products with high environmental requirements. And there are also problems of environmental pollution in the production process. In addition, the degradation rate of degradable plastic masterbatches in the existing process is generally not high. At present, the widely used degradable plastics include photodegradable plastics, biodegradable plastics, photo/biodegradable plastics and fully degradable plastics. Among them, photodegradable plastics are mainly irradiated by ultraviolet light and other light, and the electron activity of polymer molecular chains in these plastics is excited and photochemical reactions occur, then with oxygen in the air participating in the chemical reactions, the nature of the plastic is changed, and finally a photo-oxidative degradation is realized. Photodegraded plastics become brittle due to light, and with the aid of natural factors such as wind and rain, the material becomes further brittle and eventually forms a powder and is incorporated into the soil to enter a new biological cycle. Biodegradation refers to the process of degradation by microbial erosion and decomposition. Biodegradable materials are biodegraded by adding plasticizers, antioxidants and other additives to the polymers to change their properties and reduce their resistance to biological erosion. Currently, biodegradable plastics are very common, such as starch-based degradable plastics and cellulose-based degradable plastics. Photo/biodegradable plastics combine the advantages of both, however, the cost is high, the product is uncontrollable, and it may cause secondary pollution due to incomplete degradation. Fully degradable plastics are represented by starch plastics with starch content of more than 90%, but their performance has certain shortcomings, especially in mechanical properties and stability, and the price is more than 3-8 times higher than that of traditional plastics. Therefore, there is a need for a degradable plastic masterbatch with high degradation rate, complete degradation, low toxicity, good mechanical properties and low cost.

Technical Problems

U.S. Patent US2003002672 provides a laminate structure that improves the heat transfer and bonding strength of a hot melt adhesive to a laminate substrate at a lower temperature than the polyolefin alone by adding an inorganic filler to the polyolefin material, thereby improving the heat seal of the structure to the hot melt adhesive, resulting in improved bonding properties over common materials using hot melt adhesives. However, this adhesive structure is not conducive to adequate contact and reaction of the degradable material with the environment, resulting in a reduced rate of material degradation. Chinese patent with application No. 2009102374677 provides a method for preparing degradable mulch by reusing organic waste residues of biomass, by treating the waste with a low concentration of alkali, neutralizing the material with nitric acid, hydrochloric acid, sulfuric acid, ammonium sulfate, ammonium phosphate, ammonium chloride, and humic acid, and adding N, P, and K needed for plant growth, and then adding film-forming agents and plasticizers to produce the mulch material. The degradation cycle of this material is moderate, almost completely degraded in about 8 months, but its mechanical strength is low and the preparation method is environmentally dependent, so it is not suitable for other products such as toys and tableware, and the degradation products are more polluting to the environment. Chinese patent application with application No. 2011104431987 discloses nano particle/polyamide composite material, preparing polymer masterbatch with unique properties of nanomaterials and mechanical properties of polymer matrix by hydrolysis polymerization method or anion homogenization method. Based on its low production cost and simple production equipment, it is suitable for large-scale industrial production, but the degradation rate of the material and final degradability need to be improved.

Technical Solutions

The purpose of the present invention is to provide an inorganic degradable plastic masterbatch material, so that the product prepared meets the degradation requirements and has higher mechanical strength and faster degradation rate than ordinary plastic products.

The technical solution of the present invention is specified as follows.

An inorganic degradable plastic masterbatch material, which is used to prepare various environmentally friendly degradable products, comprising the following components:
  calcium carbonate mineral powder with mass percentage of 56-72%;
  polyethylene with mass percentage of 3-10%;
  polypropylene with mass percentage of 18-30%;
  glass fibers with mass percentage of 2-5%; and
  additives with mass percentage of 2-5%;
  the proportions of calcium carbonate mineral powder of different particle sizes in the above mentioned calcium carbonate mineral powder with mass percentage of 56-72% are:
    5-15% for 230 mesh with particle diameter being controlled at 65-60 microns;
    5-15% for 250 mesh with particle diameter being controlled at 60-55 microns;

5-15% for 300 mesh with particle diameter being controlled at 55-50 microns;

20-40% for 400 mesh with particle diameter being controlled at 50-35 microns;

10-45% for 800 mesh with particle diameter being controlled at 20-10 microns;

10-45% for 1200 mesh with particle diameter being controlled at 10-5 microns;

wherein, an average particle size for the calcium carbonate mineral powder as a whole must be in a range between 20 microns and 45 microns.

Preferably, the glass fibers with mass percentage of 2-5% are composite glass fibers obtained by compositing very fine glass fibers, water glass, jute fibers and carbon nanotubes.

Preferably, a mass ratio of the very fine glass fibers, water glass, jute fibers and carbon nanotubes is 10:0.5-2:2-5:1-2.5.

Preferably, the glass fibers have a diameter of 8-9 µm and a length of 0.6-1.2 mm.

Preferably, the additives include one of or a mixture of several of the following: surface modifier PN-827, heat stabilizer BASF25, lubricant zinc stearate L-608, lubricant PP wax, surface modifier stearic acid180, synergist and antioxidant.

Preferably, the synergist comprises component I and component II, the mass ratio between component I and component II being 10-15:1-3; wherein the component I is one or more of zirconate coupling agent, aluminate coupling agent, titanate coupling agent, silane coupling agent; the component II is one or more of polypropylene graft maleic anhydride, styrene graft maleic anhydride, ethylene-ethyl acrylic acid copolymer grafted with maleic anhydride, vinyl-ethylene-acetate-carbon monoxide terpolymer grafted with maleic anhydride, styrene-butadiene-styrene block copolymer graft maleic anhydride.

Preferably, the antioxidant is selected from one or a mixture of 2,6-tertiary butyl-4-methylphenol and bis(3,5-tertiary butyl-4-hydroxyphenyl) sulfide.

Preferably, a mass relationship of the additives satisfies that: a mass ratio of surface modifier PN-827, heat stabilizer BASF25, lubricant zinc stearate L-608, lubricant PP wax, surface modifier stearic acid180, synergist, and antioxidant is 0.5-2:0.3-1:0.3-1:0.3-1:0.5-1.2:3-5:0.5-1.

Preferably, the aluminate coupling agent is selected from one or more of DL-411, DL-411AF, ASA, DL-411D, DL-411DF. The zirconate coupling agent is tetra-n-propyl zirconate. The titanate coupling agent is triisostearyl isopropyl carbonate, tri(4-dodecylbenzenesulfonyl) isopropyl titanate, tri(dioctyl pyrophosphoryl) isopropyl titanate, di(dioctyl phosphoryl) ethylene titanate, di(dioctyl pyrophosphoryl) ethylene titanate, tetraisopropyl titanate di(dodecyl phosphite), tri(diphenylpropyl)-isopropyl titanate, di(methacryloyl)-isostearyl titanate. The silane coupling agent is one or more of chloropropyl silane coupling agent, epoxy silane coupling agent, methacrylate-based silane coupling agent, vinyltriethoxysilane, silylated polybutadiene compound, N-2 (aminoethyl) 3-aminopropyltrimethoxysilane, N-2 (aminoethyl) 3-aminopropyldiethoxysilane, 3-aminopropyldimethoxysilane, 3-aminopropyldiethoxysilane, 3-glycidopropyltrimethoxysilane.

Further, the present invention relates to a preparation method of inorganic degradable plastic masterbatch material, comprising the following steps: step 1: weighing and preparing calcium carbonate mixed powder meeting ratio requirement; step 2: weighing and sequentially adding calcium carbonate mineral powder with mass percentage of 56-72%, glass fibers with mass percentage of 2-5% into a mixer to mix for 5 minutes, then adding polyethylene with mass percentage of 3-10%, polypropylene with mass percentage of 18-30% and additives with mass percentage of 2-5% into the mixer to mix for 15-20 minutes to obtain a raw material mixture, while using ultrasonic vibration to tamp exhaust; step 3: melting and mixing the raw material mixture came from the mixer in an extruder, having the raw material mixture melted and extruded into strips as the temperature increases sequentially from an inlet to an outlet, then entering into ice water for rapid cooling quickly after extrusion, and passing it through a cutter for underwater high-speed dicing, then dehydrating and drying to produce a granular material of inorganic degradable plastic masterbatch.

In the method, a preferred speed of the mixer is 100-130 r/min, a ultrasonic vibration frequency is 1800-2100 Hz, and a further ultrasonic vibration frequency is 2000 Hz.

In the method, in the step 3, the temperature for melting and mixing the raw material mixture in the extruder is preferably 180° C.-280° C.

Further, the present invention provides an application of inorganic degradable plastic masterbatch material, the material can be used in many traditional plastic processes such as blow molding, blister molding, injection molding, tube drawing, calendering, film blowing, etc., and the products made by the processes meet the degradation requirements and have higher mechanical strength and faster degradation rate than ordinary plastic products.

Beneficial Effects

The present invention has the following outstanding advantages.

(1) calcium carbonate particle size: the proportions of calcium carbonate mineral powder of different particle sizes in the above mentioned calcium carbonate mineral powder with mass percentage of 56-72% are: 5-15% for 230 mesh with particle diameter being controlled at 65-60 microns;

5-15% for 250 mesh with particle diameter being controlled at 60-55 microns;

5-15% for 300 mesh with particle diameter being controlled at 55-50 microns;

20-40% for 400 mesh with particle diameter being controlled at 50-35 microns;

10-45% for 800 mesh with particle diameter being controlled at 20-10 microns;

10-45% for 1200 mesh with particle diameter being controlled at 10-5 microns;

wherein, an average particle size for the calcium carbonate mineral powder as a whole must be in a range between 20 microns and 45 microns.

On the one hand, the calcium carbonate particles in the range for average particle size can maintain the strength while maintaining the best dispersion of glass fibers and high molecular polymers to promote the consistent degradation reaction; on the other hand, when the proportions of calcium carbonate of different particle sizes in the calcium carbonate mineral powder satisfy the above-mentioned relationship, a solid distribution structure can be obtained, significantly improving the mechanical strength of the material, and obtaining the optimal balance of degradation rate and stability. When the calcium carbonate particle size does not meet the above requirements of proportions, or when the particle diameter of the mineral powder is higher or lower, the material degradability and mechanical properties will be reduced.

(2) The composite glass fibers are composite glass fibers prepared by mixing very fine glass fibers, water glass, jute fibers and carbon nanotubes in the mass ratio of 10:0.5-2:

2-5:1-2.5. The addition of carbon nanotubes, water glass, and jute fibers as short fibers has a synergistic effect. Within the above-mentioned limitations, the compositions of the composite glass fibers filler acted synergistically with each other, which significantly promotes the interfacial interaction between the inorganic filler and the polymer material, increases the non-entanglement density of the polymer chains in the masterbatch material, and significantly increases the loss modulus and storage modulus of the material. The above-mentioned compositions with the proportions have both strong mechanical strength and significantly increased degradation rate, which in turn improved the mechanical strength and degradation rate of the masterbatch material as a whole. When carbon nanotubes, water glass, and jute fibers are added beyond this range, the material is either not strong enough or the degradation rate is reduced. For example, when the content of carbon nanotubes in glass fibers is further increased or the content of jute fibers is further decreased, partial agglomeration effects will occur in glass fibers, resulting in lower dynamic mechanical properties; otherwise, the fibers will not change the polymer chain morphology and behavior, resulting in lower degradation properties of the material.

(3) The glass fibers have a diameter of 8-9 μm and a length of 0.6-1.2 mm, achieving the best distribution effect and filling effect.

(4) Synergist: component I and component II of synergist in the mass ratio of 10-15:1-3 will act synergistically to increase the degradation rate of calcium carbonate and promote the degradation of polyethylene and polypropylene in the masterbatch while improving the dispersible uniformity and interfacial bonding of calcium carbonate particles and glass fibers. Further increase of component I or component II in the above range will reduce the degradation rate and decrease the interfacial bonding effect of the particles, which will affect the mechanical properties of the material.

(5) The zinc stearate and the like in the additives accelerate the cracking and aging of the polypropylene in the mixed masterbatch, which makes the whole crushing and fracturing, and the contact of the section with air in a large area; especially when it encounters sulfurous acid and other substances composed of sulfide in the air and rainwater, the small particles of calcium carbonate will be crushed more rapidly and become smaller pieces under the washing of rainwater. The synergist and other compositions of the additives further promote the contact area of calcium carbonate and polymer materials with air and degradation rate of calcium carbonate, making the material degrades eventually. After degradation, a large amount of residual calcium carbonate powder is returned to the soil, which is harmless and non-polluting.

OPTIMAL EMBODIMENT OF THE PRESENT INVENTION

Embodiment 1

Preparation of Inorganic Degradable Plastic Masterbatch Material:

step 1: weighing 5% calcium carbonate powder with a diameter of 65-60 microns; 15% calcium carbonate powder with a diameter of 60-55 microns; 15% calcium carbonate powder with a diameter of 55-50 microns; 40% calcium carbonate powder with a diameter of 50-35 microns; 15% calcium carbonate powder with a diameter of 20-10 microns; 10% calcium carbonate powder with a diameter of 10-5 microns to prepare calcium carbonate mixed particles;

step 2: weighing and sequentially adding the calcium carbonate mixed particles prepared in step 1 with mass percentage of 56%, glass fibers with mass percentage of 5% to a mixer to mix for 5 minutes, then adding polyethylene with mass percentage of 5%, polypropylene with mass percentage of 30%, and additives with mass percentage of 4% to the mixer to mix for 20 minutes to obtain a raw material mixture, the speed of the mixer is 130 r/min, while using ultrasonic vibration to tamp exhaust, the ultrasonic vibration frequency is 2100 Hz;

step 3: melting and mixing the raw material mixture came from the mixer in an extruder, having the raw material mixture melted and extruded into strips as the temperature increases sequentially from an inlet to an outlet, then entering into ice water for rapid cooling quickly after extrusion, and passing it through a cutter for underwater high-speed dicing, then dehydrating and drying to produce a granular material of inorganic degradable plastic masterbatch.

In the step 3, the temperature for melting and mixing the raw material mixture in the extruder is 280° C.

The mass ratio of surface modifier PN-827, heat stabilizer BASF25, lubricant zinc stearate L-608, lubricant PP wax, surface modifier stearic180 acid, synergist and antioxidant is 0.5:0.3:0.3:0.3:1:5:0.5; synergist includes silane coupling agent and vinyl-ethylene-acetate-carbon monoxide terpolymer grafted with maleic anhydride, with a mass ratio of 10:1. The silane coupling agent is 3-aminopropyltrimethoxysilane.

The antioxidant is selected from 2,6-tertiary butyl-4-methylphenol.

The glass fibers are composite glass fibers obtained by compositing very fine glass fibers, water glass, jute fibers and carbon nanotubes; the glass fibers have a diameter of 8 μm and a length of 1.2 mm; the very fine glass fibers, water glass, jute fiber and carbon nanotubes have a mass ratio of 10:0.5:2:2.5.

Embodiments of the Present Invention

Embodiment 2

Preparation of Inorganic Degradable Plastic Masterbatch Material:

step 1: weighing 15% calcium carbonate powder with a diameter of 65-60 microns; 15% calcium carbonate powder with a diameter of 60-55 microns; 5% calcium carbonate powder with a diameter of 55-50 microns; 40% calcium carbonate powder with a diameter of 50-35 microns; 10% calcium carbonate powder with a diameter of 20-10 microns; 15% calcium carbonate powder with a diameter of 10-5 microns to prepare calcium carbonate mixed particles;

step 2: weighing and sequentially adding the calcium carbonate mixed particles prepared in step 1 with mass percentage of 58%, glass fibers with mass percentage of 5% to a mixer to mix for 5 minutes, then adding polyethylene with mass percentage of 3%, polypropylene with mass percentage of 30%, and additives with mass percentage of 4% to the mixer to mix for 20 minutes to obtain a raw material mixture, the speed of the mixer is 130 r/min, while using ultrasonic vibration to tamp exhaust, the ultrasonic vibration frequency is 1800 Hz;

step 3: melting and mixing the raw material mixture came from the mixer in an extruder, having the raw material mixture melted and extruded into strips as the temperature increases sequentially from an inlet to an outlet, then entering into ice water for rapid cooling quickly after extrusion, and passing it through a cutter for underwater high-speed dicing, then dehydrating and drying to produce a granular material of inorganic degradable plastic masterbatch.

In the above step 3, the temperature for melting and mixing the raw material mixture in the extruder is 270° C.

The mass ratio of surface modifier PN-827, heat stabilizer BASF25, lubricant zinc stearate L-608, lubricant PP wax, surface modifier stearic180 acid, synergist and antioxidant is 1:0.5:0.5:1:0.5:3:0.5; synergist includes silane coupling agent and vinyl-ethylene-acetate-carbon monoxide terpolymer grafted with maleic anhydride, with a mass ratio of 15:1. The silane coupling agent is 3-aminopropyltriethoxysilane.

The antioxidant is bis(3,5-tertiary butyl-4-hydroxyphenyl) sulfide.

The glass fibers are composite glass fibers obtained by compositing very fine glass fibers, water glass, jute fibers and carbon nanotubes; the glass fibers have a diameter of 9 μm and a length of 1.2 mm; the very fine glass fibers, water glass, jute fiber and carbon nanotubes have a mass ratio of 10:2:2:2.5.

Embodiment 3

Preparation of Inorganic Degradable Plastic Masterbatch Material:
step 1: weighing 15% calcium carbonate powder with a diameter of 65-60 microns; 15% calcium carbonate powder with a diameter of 60-55 microns; 15% calcium carbonate powder with a diameter of 55-50 microns; 20% calcium carbonate powder with a diameter of 50-35 microns; 15% calcium carbonate powder with a diameter of 20-10 microns; 20% calcium carbonate powder with a diameter of 10-5 microns to prepare calcium carbonate mixed particles;
step 2: weighing and sequentially adding the above calcium carbonate mixed particles prepared in step 1 with mass percentage of 57%, glass fibers with mass percentage of 3% to a mixer to mix for 5 minutes, then adding polyethylene with mass percentage of 5%, polypropylene with mass percentage of 30%, and additives with mass percentage of 5% to the mixer to mix for 20 minutes to obtain a raw material mixture, the speed of the mixer is 120 r/min, while using ultrasonic vibration to tamp exhaust, the ultrasonic vibration frequency is 1900 Hz;
step 3: melting and mixing the raw material mixture came from the mixer in an extruder, having the raw material mixture melted and extruded into strips as the temperature increases sequentially from an inlet to an outlet, then entering into ice water for rapid cooling quickly after extrusion, and passing it through a cutter for underwater high-speed dicing, then dehydrating and drying to produce a granular material of inorganic degradable plastic masterbatch.

In the above step 3, the temperature for melting and mixing the raw material mixture in the extruder is 230° C.

The mass ratio of surface modifier PN-827, heat stabilizer BASF25, lubricant zinc stearate L-608, lubricant PP wax, surface modifier stearic180 acid, synergist and antioxidant is 2:1:1:1:1:3:0.5; synergist includes silane coupling agent and styrene-butadiene-styrene block copolymer graft maleic anhydride, with a mass ratio of 15:3. The silane coupling agent is 3-aminopropyltriethoxysilane.

The antioxidant is bis(3,5-tertiary butyl-4-hydroxyphenyl) sulfide.

The glass fibers are composite glass fibers obtained by compositing very fine glass fibers, water glass, jute fibers and carbon nanotubes; the glass fibers have a diameter of 9 μm and a length of 0.6 mm; the very fine glass fibers, water glass, jute fiber and carbon nanotubes have a mass ratio of 10:0.5:5:1.

Embodiment 4

Preparation of Inorganic Degradable Plastic Masterbatch Material:
step 1: weighing 5% calcium carbonate powder with a diameter of 65-60 microns; 5% calcium carbonate powder with a diameter of 60-55 microns; 15% calcium carbonate powder with a diameter of 55-50 microns; 20% calcium carbonate powder with a diameter of 50-35 microns; 45% calcium carbonate powder with a diameter of 20-10 microns; 10% calcium carbonate powder with a diameter of 10-5 microns to prepare calcium carbonate mixed particles;
step 2: weighing and sequentially adding the calcium carbonate mixed particles prepared in step 1 with mass percentage of 57%, glass fibers with mass percentage of 2% to a mixer to mix for 5 minutes, then adding polyethylene with mass percentage of 8%, polypropylene with mass percentage of 30%, and additives with mass percentage of 3% to the mixer to mix for 20 minutes to obtain a raw material mixture, the speed of the mixer is 110 r/min, while using ultrasonic vibration to tamp exhaust, the ultrasonic vibration frequency is 2000 Hz;
step 3: melting and mixing the raw material mixture came from the mixer in an extruder, having the raw material mixture melted and extruded into strips as the temperature increases sequentially from an inlet to an outlet, then entering into ice water for rapid cooling quickly after extrusion, and passing it through a cutter for underwater high-speed dicing, then dehydrating and drying to produce a granular material of inorganic degradable plastic masterbatch.

In the above step 3, the temperature for melting and mixing the raw material mixture in the extruder is 200° C.

The mass ratio of surface modifier PN-827, heat stabilizer BASF25, lubricant zinc stearate L-608, lubricant PP wax, surface modifier stearic180 acid, synergist and antioxidant is 2:1:0.5:1:1.2:3.1; synergist includes zirconate coupling agent and styrene-butadiene-styrene block copolymer graft maleic anhydride, with a mass ratio of 15:1. The zirconate coupling agent is tetra-n-propyl zirconate.

The antioxidant is bis(3,5-tertiary butyl-4-hydroxyphenyl) sulfide.

The glass fibers are composite glass fibers obtained by compositing very fine glass fibers, water glass, jute fibers and carbon nanotubes; the glass fibers have a diameter of 8 μm and a length of 0.6 mm; the very fine glass fibers, water glass, jute fiber and carbon nanotubes have a mass ratio of 10:1:3:1.5.

Embodiment 5

Preparation of Inorganic Degradable Plastic Masterbatch Material:
- step 1: weighing 5% calcium carbonate powder with a diameter of 65-60 microns; 5% calcium carbonate powder with a diameter of 60-55 microns; 5% calcium carbonate powder with a diameter of 55-50 microns; 20% calcium carbonate powder with a diameter of 50-35 microns; 20% calcium carbonate powder with a diameter of 20-10 microns; 45% calcium carbonate powder with a diameter of 10-5 microns to prepare calcium carbonate mixed particles;
- step 2: weighing and sequentially adding the calcium carbonate mixed particles prepared in step 1 with mass percentage of 72%, glass fibers with mass percentage of 2% to a mixer to mix for 5 minutes, then adding polyethylene with mass percentage of 3%, polypropylene with mass percentage of 18%, and additives with mass percentage of 5% to the mixer to mix for 20 minutes to obtain a raw material mixture, the speed of the mixer is 110 r/min, while using ultrasonic vibration to tamp exhaust, the ultrasonic vibration frequency is 2100 Hz;
- step 3: melting and mixing the raw material mixture came from the mixer in an extruder, having the raw material mixture melted and extruded into strips as the temperature increases sequentially from an inlet to an outlet, then entering into ice water for rapid cooling quickly after extrusion, and passing it through a cutter for underwater high-speed dicing, then dehydrating and drying to produce a granular material of inorganic degradable plastic masterbatch.

In the above step 3, the temperature for melting and mixing the raw material mixture in the extruder is 180° C.

The mass ratio of surface modifier PN-827, heat stabilizer BASF25, lubricant zinc stearate L-608, lubricant PP wax, surface modifier stearic180 acid, synergist and antioxidant is 1.5:1:0.5:1:1:4:1; synergist includes titanate coupling agent and styrene-butadiene-styrene block copolymer graft maleic anhydride. The titanate coupling agent is tri(4-dodecylbenzenesulfonyl) isopropyl titanate, with a mass ratio of 12:3.

The antioxidant is 2,6-tertiary butyl-4-methylphenol.

The glass fibers are composite glass fibers obtained by compositing very fine glass fibers, water glass, jute fibers and carbon nanotubes: the glass fibers have a diameter of 8.5 μm and a length of 1 mm; the very fine glass fibers, water glass, jute fiber and carbon nanotubes have a mass ratio of 10:05:3:2.5.

Embodiment 6

Preparation of Inorganic Degradable Plastic Masterbatch Material:
- step 1: weighing 5% calcium carbonate powder with a diameter of 65-60 microns; 15% calcium carbonate powder with a diameter of 60-55 microns; 15% calcium carbonate powder with a diameter of 55-50 microns; 40% calcium carbonate powder with a diameter of 50-35 microns; 12% calcium carbonate powder with a diameter of 20-10 microns; 13% calcium carbonate powder with a diameter of 10-5 microns to prepare calcium carbonate mixed particles;
- step 2: weighing and sequentially adding the calcium carbonate mixed particles prepared in step 1 with mass percentage of 60%, glass fibers with mass percentage of 5% to a mixer to mix for 5 minutes, then adding polyethylene with mass percentage of 10%, polypropylene with mass percentage of 20%, and additives with mass percentage of 5% to the mixer to mix for 15 minutes to obtain a raw material mixture, the speed of the mixer is 100 r/min, while using ultrasonic vibration to tamp exhaust, the ultrasonic vibration frequency is 2000 Hz;
- step 3: melting and mixing the raw material mixture came from the mixer in an extruder, having the raw material mixture melted and extruded into strips as the temperature increases sequentially from an inlet to an outlet, then entering into ice water for rapid cooling quickly after extrusion, and passing it through a cutter for underwater high-speed dicing, then dehydrating and drying to produce a granular material of inorganic degradable plastic masterbatch.

In the above step 3, the temperature for melting and mixing the raw material mixture in the extruder is 240° C.

The mass ratio of surface modifier PN-827, heat stabilizer BASF25, lubricant zinc stearate L-608, lubricant PP wax, surface modifier stearic180 acid, synergist and antioxidant is 1:0.5:0.5:1:1:5:0.8; synergist includes of silane coupling agent and ethylene-ethyl acrylic acid copolymer grafted with maleic anhydride, with a mass ratio of 15:2 The silane coupling agent is N-2 (aminoethyl)3-aminopropyldiethoxysilane.

The antioxidant is 2,6-tertiary butyl-4-methylphenol.

The glass fibers are composite glass fibers obtained by compositing very fine glass fibers, water glass, jute fibers and carbon nanotubes; the glass fibers have a diameter of 8 μm and a length of 1.1 mm; the very fine glass fibers, water glass, jute fiber and carbon nanotubes have a mass ratio of 10:2:3:2.5.

Embodiment 7

Preparation of Inorganic Degradable Plastic Masterbatch Material:
- step 1: weighing 5% calcium carbonate powder with a diameter of 65-60 microns; 15% calcium carbonate powder with a diameter of 60-55 microns; 15% calcium carbonate powder with a diameter of 55-50 microns; 30% calcium carbonate powder with a diameter of 50-35 microns; 15% calcium carbonate powder with a diameter of 20-10 microns; 20% calcium carbonate powder with a diameter of 10-5 microns to prepare calcium carbonate mixed particles;
- step 2: weighing and sequentially adding the calcium carbonate mixed particles prepared in step 1 with mass percentage of 65%, glass fibers with mass percentage of 4% to a mixer to mix for 5 minutes, then adding polyethylene with mass percentage of 6%, polypropylene with mass percentage of 20%, and additives with mass percentage of 5% to the mixer to mix for 15 minutes to obtain a raw material mixture, the speed of the mixer is 100 r/min, while using ultrasonic vibration to tamp exhaust, the ultrasonic vibration frequency is 2100 Hz;
- step 3: melting and mixing the raw material mixture came from the mixer in an extruder, having the raw material mixture melted and extruded into strips as the temperature increases sequentially from an inlet to an outlet, then entering into ice water for rapid cooling quickly after extrusion, and passing it through a cutter for underwater high-speed dicing, then dehydrating and drying to produce a granular material of inorganic degradable plastic masterbatch.

In the above step 3, the temperature for melting and mixing the raw material mixture in the extruder is 260° C.

The mass ratio of surface modifier PN-827, heat stabilizer BASF25, lubricant zinc stearate L-608, lubricant PP wax, surface modifier stearic180 acid, synergist and antioxidant is 1:0.5:0.5:0.8:1:5:1; synergist includes component I and component II with a mass ratio of 10:3, wherein the component I is aluminate coupling agent; the component II is a mixture of ethylene-ethyl acrylic acid copolymer grafted with maleic anhydride and polypropylene graft maleic anhydride. The aluminate coupling agent is DL-411AF.

The antioxidant is 2,6-tertiary butyl-4-methylphenol.

The glass fibers are composite glass fibers obtained by compositing very fine glass fibers, water glass, jute fibers and carbon nanotubes; the glass fibers have a diameter of 9 μm and a length of 0.8 mm; the very fine glass fibers, water glass, jute fiber and carbon nanotubes have a mass ratio of 10:1:3:1.

Embodiment 8

Preparation of Inorganic Degradable Plastic Masterbatch Material:
step 1: weighing 15% calcium carbonate powder with a diameter of 65-60 microns; 5% calcium carbonate powder with a diameter of 60-55 microns; 15% calcium carbonate powder with a diameter of 55-50 microns; 30% calcium carbonate powder with a diameter of 50-35 microns; 15% calcium carbonate powder with a diameter of 20-10 microns; 20% calcium carbonate powder with a diameter of 10-5 microns to prepare calcium carbonate mixed particles;
step 2: weighing and sequentially adding the calcium carbonate mixed particles prepared in step 1 with mass percentage of 70%, glass fibers with mass percentage of 2% to a mixer to mix for 5 minutes, then adding polyethylene with mass percentage of 5%, polypropylene with mass percentage of 20%, and additives with mass percentage of 3% to the mixer to mix for 20 minutes to obtain a raw material mixture, the speed of the mixer is 120 r/min, while using ultrasonic vibration to tamp exhaust, the ultrasonic vibration frequency is 2100 Hz; step 3: melting and mixing the raw material mixture came from the mixer in an extruder, having the raw material mixture melted and extruded into strips as the temperature increases sequentially from an inlet to an outlet, then entering into ice water for rapid cooling quickly after extrusion, and passing it through a cutter for underwater high-speed dicing, then dehydrating and drying to produce a granular material of inorganic degradable plastic masterbatch.

In the above step 3, the temperature for melting and mixing the raw material mixture in the extruder is 220° C.

The mass ratio of surface modifier PN-827, heat stabilizer BASF25, lubricant zinc stearate L-608, lubricant PP wax, surface modifier stearic180 acid, synergist and antioxidant is 1:0.5:0.5:1:1:3:0.8; synergist includes component I and component II with a mass ratio of 11:2, wherein the component I is silane coupling agent; the component II is a mixture of styrene-butadiene-styrene block copolymer graft maleic anhydride and styrene graft maleic anhydride. The silane coupling agent is methacrylate-based silane coupling agent.

The antioxidant is obtained by preparing 2,6-tertiary butyl-4-methylphenol and bis(3,5-tertiary butyl-4-hydroxyphenyl) sulfide in a mass ratio of 1:1.

The glass fibers are composite glass fibers obtained by compositing very fine glass fibers, water glass, jute fibers and carbon nanotubes; the glass fibers have a diameter of 8.5 μm and a length of 0.9 mm; the very fine glass fibers, water glass, jute fiber and carbon nanotubes have a mass ratio of 10:0.5:5:1.5.

INDUSTRIAL APPLICABILITY

Comparative Example 1

The inorganic degradable plastic masterbatch material prepared by the preparation method as described in Embodiment 1, with the difference that no glass fiber was added.

Comparative Example 2

The inorganic degradable plastic masterbatch material prepared by the preparation method as described in Embodiment 1, with the difference that the auxiliary synergist contains only one component, i.e., silane coupling agent.

Comparative Example 3

The inorganic degradable plastic masterbatch material prepared by the preparation method as described in Embodiment 2, with the difference that the auxiliary synergist is zirconate coupling agent and polypropylene graft maleic anhydride with a mass ratio of 1:1.

Comparative Example 4

The inorganic degradable plastic masterbatch material prepared by the preparation method as described in Embodiment 3, with the difference that compositions of the auxiliary synergist are aluminate coupling agent and styrene graft maleic anhydride with a mass ratio of 1:3.

Comparative Example 5

The inorganic degradable plastic masterbatch material prepared by the preparation method as described in Embodiment 4, with the difference that compositions of the auxiliary synergist are titanate coupling agent and styrene-butadiene-styrene block copolymer graft maleic anhydride with a mass ratio of 3:1.

Comparative Example 6

The inorganic degradable plastic masterbatch material prepared by the preparation method as described in Embodiment 5, with the difference that compositions of the auxiliary synergist are silane coupling agent and polypropylene graft maleic anhydride with a mass ratio of 7:3.

Comparative Example 7

The inorganic degradable plastic masterbatch material prepared by the preparation method as described in Embodiment 6, with the difference that the synergist in the masterbatch consists only of styrene graft maleic anhydride.

Comparative Example 8

The inorganic degradable plastic masterbatch material prepared by the preparation method as described in Embodiment 7, with the difference that the glass fibers are common glass fibers.

Comparative Example 9

The inorganic degradable plastic masterbatch material prepared by the preparation method as described in Embodiment 2, with the difference that no carbon nanotubes were added to the glass fibers.

Comparative Example 10

The inorganic degradable plastic masterbatch material prepared by the preparation method as described in Embodiment 3, with the difference that no jute fibers were added to the glass fibers.

Comparative Example 11

The inorganic degradable plastic masterbatch material prepared by the preparation method as described in Embodiment 3, with the difference that no water glass was added to the glass fibers.

Comparative Example 12

The inorganic degradable plastic masterbatch material prepared by the preparation method as described in Embodiment 6, with the difference that the composite glass fibers have a diameter of 7 μm and a length of 1 mm.

Comparative Example 13

The inorganic degradable plastic masterbatch material prepared by the preparation method as described in Embodiment 6, with the difference that the composite glass fibers have a diameter of 8 μm and a length of 3 mm.

Comparative Example 14

The inorganic degradable plastic masterbatch material prepared by the preparation method as described in Embodiment 1, with the difference that the composite glass fibers have a diameter of 10 μm and a length of 0.2 mm.

Comparative Example 15

The inorganic degradable plastic masterbatch material prepared by the preparation method as described in Embodiment 2, with the difference that the composite glass fibers have a diameter of 12 μm and a length of 1 mm.

Comparative Example 16

The inorganic degradable plastic masterbatch material prepared by the preparation method as described in Embodiment 3, with the difference that the mass ratio of very fine glass fibers, water glass, jute fibers and carbon nanotubes in the composite glass fibers is 10:0.5:1:5.

Comparative Example 17

The inorganic degradable plastic masterbatch material prepared by the preparation method as described in Embodiment 4, with the difference that the average particle size of the calcium carbonate mineral powder is 15 microns.

Comparative Example 18

The inorganic degradable plastic masterbatch material prepared by the preparation method as described in Embodiment 7, with the difference that the average particle size of the calcium carbonate mineral powder is 50 microns.

Table 1 and Table 2 show the tensile strength, flexural strength, flexural modulus of embodiments and comparative examples measured with reference to relevant standards, and data after 6 months, after 8 months and after 1 year (after 12 months) in a degradable environment.

TABLE 1

Tensile Strength, Flexural Strength, Flexural Modulus

| Test Items | Tensile Strength 23° C. Standard ASTMD638 Unit MPa | Tensile Strength 23° C. Standard ASTMD790 Unit MPa | Tensile Strength 23° C. Standard ASTMD790 Unit MPa |
|---|---|---|---|
| Embodiment 1 | 38 | 49.5 | 2560 |
| Embodiment 2 | 38.2 | 49.2 | 2607 |
| Embodiment 3 | 39 | 47.8 | 2705 |
| Embodiment 4 | 36.9 | 47.2 | 2716 |
| Embodiment 5 | 37.5 | 45.2 | 2800 |
| Embodiment 6 | 36 | 46.8 | 2612 |
| Embodiment 7 | 387 | 45.7 | 2693 |
| Embodiment 8 | 37 | 50.2 | 2579 |
| Comparative Example 1 | 28.3 | 39.5 | 1807 |
| Comparative Example 2 | 29 | 38.8 | 1864 |
| Comparative Example 3 | 26.7 | 39.1 | 1973 |
| Comparative Example 4 | 25 | 38.5 | 2013 |
| Comparative Example 5 | 26.3 | 35 | 1789 |
| Comparative Example 6 | 27.2 | 34 | 1695 |
| Comparative Example 7 | 27.1 | 36.2 | 1974 |
| Comparative Example 8 | 25.4 | 38.9 | 1887 |
| Comparative Example 9 | 23.7 | 32.1 | 2109 |
| Comparative Example 10 | 25 | 33.4 | 1567 |
| Comparative Example 11 | 26.7 | 28.1 | 1742 |
| Comparative Example 12 | 25.8 | 28.9 | 1836 |
| Comparative Example 13 | 23.2 | 32.7 | 1903 |
| Comparative Example 14 | 24.8 | 32.9 | 1879 |
| Comparative Example 15 | 26 | 33.1 | 2002 |
| Comparative Example 16 | 25.6 | 33.6 | 1740 |
| Comparative Example 17 | 27.1 | 37.5 | 1509 |
| Comparative Example 18 | 26.4 | 31 | 1976 |

TABLE 2

After 6 Months, After 8 Months And After 1 Year (After 12 Months) In A Degradable Environment

| Test Items | Degradation Rate After 6 Months | Degradation Rate After 8 Months | Degradation Rate After 1 Year |
|---|---|---|---|
| Embodiment 1 | 69 | 97.9 | 99.1 |
| Embodiment 2 | 65 | 95.6 | 97.2 |
| Embodiment 3 | 62.3 | 93.8 | 96.8 |
| Embodiment 4 | 59.8 | 92.7 | 95.7 |
| Embodiment 5 | 62 | 94.2 | 96.1 |
| Embodiment 6 | 64.1 | 89.9 | 94.8 |
| Embodiment 7 | 63.9 | 91.7 | 96.2 |
| Embodiment 8 | 62.1 | 95.4 | 98.1 |
| Comparative Example 1 | 34 | 60.5 | 69.1 |
| Comparative Example 2 | 40.3 | 46.9 | 60.9 |
| Comparative Example 3 | 36 | 47.8 | 56.2 |
| Comparative Example 4 | 37.2 | 42.3 | 52.8 |
| Comparative Example 5 | 36.9 | 46.9 | 56.9 |
| Comparative Example 6 | 25.6 | 39.6 | 49.7 |

TABLE 2-continued

After 6 Months, After 8 Months And After 1 Year (After 12 Months) In A Degradable Environment

| Test Items | Degradation Rate After 6 Months | Degradation Rate After 8 Months | Degradation Rate After 1 Year |
|---|---|---|---|
| Comparative Example 7 | 28.7 | 49 | 60.1 |
| Comparative Example 8 | 25.4 | 48.5 | 61.2 |
| Comparative Example 9 | 27.7 | 45.2 | 55.2 |
| Comparative Example 10 | 28 | 28.1 | 38.2 |
| Comparative Example 11 | 26.9 | 40.5 | 52.5 |
| Comparative Example 12 | 25.6 | 40.9 | 48.9 |
| Comparative Example 13 | 24.2 | 37.9 | 57.2 |
| Comparative Example 14 | 23.9 | 49.2 | 59.1 |
| Cornparatkle Example 15 | 30.7 | 49 | 60.2 |
| Comparative Example 16 | 33.8 | 58.3 | 70.5 |
| Comparative Example 17 | 36.1 | 54.1 | 69.5 |
| Comparative Example 18 | 27.9 | 40.7 | 59.4 |

Toxicity detection results of degradation products after degradation of masterbatch materials are shown in Table 3.

Remarks:
(1) 1 mg/kg=0.0001%
(2) MDL=method detection limit
(3) ND=not detected (<MDL)
(4) "-"=not specified Test method: determination by reference to USEPA5021A:2014 method, analysis by using HS-GC-MS.

TABLE 3

Toxicity Detection Results Of Degradation Products

| Test Items | CAS NO. | Unit | MDL | Test Result |
|---|---|---|---|---|
| 1,1-Dichloroethylene | 75-35-4 | μg/g | 1 | ND |
| Dichloromethane | 75-09-2 | μg/g | 1 | ND |
| cis/trans-1,2,-dichloroethylene | 156-59-2/ 156-60-5 | μg/g | 2 | ND |
| 1,1-Dichloroethane | 75-34-3 | μg/g | 1 | ND |
| 2,2-Dichloropropane | 594-20-7 | μg/g | 1 | ND |
| Bromochloromethane | 74-97-5 | μg/g | 1 | ND |
| chloroform | 67-66-3 | μg/g | 1 | ND |
| 1,1,1-trichloroethane | 71-55-6 | μg/g | 1 | ND |
| 1,1-Dichloropropene | 563-58-6 | μg/g | 1 | ND |
| Carbon tetrachloride | 56-23-5 | μg/g | 1 | ND |
| Benzene | 71-43-2 | μg/g | 1 | ND |
| 1,2-Dichloroethane | 107-06-2 | μg/g | I | ND |
| Trichloroethylene | 79-01-6 | μg/g | 1 | ND |
| 1,2-Dichloropropane | 78-87-5 | μg/g | 1 | ND |
| Dibromomethane | 74-95-3 | μg/g | 1 | ND |
| Monobromodichloromethane | 75-27-4 | μg/g | 1 | ND |
| cis/trans-1,3-dichloropropene | 10061-01-5/ 10061-02-6 | μg/g | 1 | ND |
| Toluene | 108-88-3 | μg/g | 2 | ND |
| 1,1,2-trichloroethane | 79-00-5 | μg/g | 1 | ND |
| Tetrachloroethylene | 127-18-4 | μg/g | 1 | ND |
| 1,3-Dichloropropane | 142-28-9 | μg/g | 1 | ND |

It can be seen that products prepared by the inorganic degradable plastic masterbatch material according to the present invention meet degradation requirements and have higher mechanical strength and faster degradation rate than ordinary plastic products.

What is claimed is:

1. An inorganic degradable plastic masterbatch material, used to prepare various environmentally friendly degradable products, comprising the following components:
    calcium carbonate mineral powder with mass percentage of 56-72%;
    polyethylene with mass percentage of 3-10%;
    polypropylene with mass percentage of 18-30%;
    glass fibers with mass percentage of 2-5%; and
    additives with mass percentage of 2-5%;
    proportions of calcium carbonate mineral powder of different particle sizes in the above mentioned calcium carbonate mineral powder with mass percentage of 56-72% are:
    5-15% with particle diameter being controlled at 65-60 microns;
    5-15% with particle diameter being controlled at 60-55 microns;
    5-15% with particle diameter being controlled at 55-50 microns;
    20-40% with particle diameter being controlled at 50-35 microns;
    10-45% with particle diameter being controlled at 20-10 microns; and
    10-45% with particle diameter being controlled at 10-5 microns;
    wherein, an average particle size for the calcium carbonate mineral powder as a whole must be in a range between 20 microns and 45 microns;
    wherein the glass fibers with mass percentage of 2-5% are composite glass fibers obtained by compositing very fine glass fibers, water glass, jute fibers and carbon nanotubes; wherein a mass ratio of the very fine glass fibers, water glass, jute fibers and carbon nanotubes is 10:0.5-2:2-5:1-2.5;
    wherein the additives include a synergist;
    wherein the additives further include one of or a mixture of two of the following: lubricant PP wax and antioxidant;
    wherein the synergist comprises component I and component II, a mass ratio between component I and component II being 10-15:1-3; wherein the component I is one or more of zirconate coupling agent, aluminate coupling agent, titanate coupling agent, and silane coupling agent; the component II is one or more of polypropylene graft maleic anhydride, styrene graft maleic anhydride, ethylene-ethyl acrylic acid copolymer grafted with maleic anhydride, vinyl-ethylene-acetate-carbon monoxide terpolymer grafted with maleic anhydride, and styrene-butadiene-styrene block copolymer graft maleic anhydride.

2. The inorganic degradable plastic masterbatch material according to claim 1, wherein the glass fibers have a diameter of 8-9 μm and a length of 0.6-1.2 mm.

3. The inorganic degradable plastic masterbatch material according to claim 2, wherein the zirconate coupling agent is tetra-n-propyl zirconate.

4. The inorganic degradable plastic masterbatch material according to claim 2, wherein the titanate coupling agent is triisostearyl isopropyl carbonate, tri(4-dodecylbenzenesulfonyl) isopropyl titanate, tri(dioctyl pyrophosphoryl) isopropyl titanate, di(dioctyl phosphoryl) ethylene titanate, di(dioctyl pyrophosphoryl) ethylene titanate, tetraisopropyl titanate di(dodecyl phosphite), tri(diphenylpropyl)-isopropyl titanate, or di(methacryloyl)-isostearyl titanate.

5. The inorganic degradable plastic masterbatch material according to claim 2, wherein the silane coupling agent is one or more of chloropropyl silane coupling agent, epoxy silane coupling agent, methacrylate-based silane coupling agent, vinyltriethoxysilane, silylated polybutadiene compound, N-2 (aminoethyl) 3-aminopropyltrimethoxysilane, N-2 (aminoethyl) 3-aminopropyldiethoxysilane, 3-aminopropyldimethoxysilane, 3-aminopropyldiethoxysilane, and 3-glycidopropyltrimethoxysilane.

6. The inorganic degradable plastic masterbatch material according to claim 2, wherein the antioxidant is selected from one or a mixture of 2,6, 6-tertiary butyl-4-methylphenol and bis(3,5, 5-tertiary butyl-4-hydroxyphenyl) sulfide.

7. A preparation method of the inorganic degradable plastic masterbatch material according to claim 1, comprising the following steps: step 1: weighing and preparing calcium carbonate mixed powder meeting ratio requirement; step 2: weighing and sequentially adding calcium carbonate mineral powder with mass percentage of 56-72%, glass fibers with mass percentage of 2-5% into a mixer to mix for 5 minutes, then adding polyethylene with mass percentage of 3-10%, polypropylene with mass percentage of 18-30% and additives with mass percentage of 2-5% into the mixer to mix for 15-20 minutes to obtain a raw material mixture, while using ultrasonic vibration to tamp exhaust; step 3: melting and mixing the raw material mixture came from the mixer in an extruder, having the raw material mixture melted and extruded into strips as the temperature increases sequentially from an inlet to an outlet, then entering into ice water for rapid cooling after extrusion, and passing it through a cutter for underwater high-speed dicing, then dehydrating and drying to produce a granular material of inorganic degradable plastic masterbatch.

8. The preparation method of the inorganic degradable plastic masterbatch material according to claim 7, wherein a speed of the mixer is 110-130 r/min, an ultrasonic vibration frequency is 1800-2100 Hz.

9. The preparation method of the inorganic degradable plastic masterbatch material according to claim 7, wherein the ultrasonic vibration frequency is 2000 Hz.

10. The preparation method of the inorganic degradable plastic masterbatch material according to claim 7, wherein in the step 3, a temperature for melting and mixing the raw material mixture in the extruder is 180° C.-280° C.

11. A method of using the inorganic degradable plastic masterbatch material according to claim 1, the material can be used in traditional plastic processes of blow molding, blister molding, injection molding, tube drawing, calendering, or film blowing.

* * * * *